OR 3,785,712

United States X 3053 R Y 3057 N
X 3054 N

Hannan

[11] 3,785,712

[45] Jan. 15, 1974

[54] PLAYING BACK REDUNDANT HOLOGRAMS BY SCANNING

[75] Inventor: William James Hannan, Pennington, N.J.

[73] Assignee: RCA Corporation, New York, N.Y.

[22] Filed: Mar. 27, 1972

[21] Appl. No.: 238,315

[52] U.S. Cl. .......... 350/3.5, 178/6.7 R, 350/162 SF
[51] Int. Cl. .......... G02b 27/00
[58] Field of Search .......... 350/3.5, 162 SF; 178/5.4 E, 5.4 ES, 6.7 R

[56] References Cited

UNITED STATES PATENTS

| | | | |
|---|---|---|---|
| 3,547,510 | 12/1970 | DeBittetto | 350/3.5 |
| 3,689,129 | 9/1972 | Lurie | 350/3.5 |
| 3,674,331 | 7/1972 | Caulfield | 350/3.5 |

OTHER PUBLICATIONS

Groh, Applied Optics, Vol. 10, No. 11, Nov. 1971, pp. 2549–2550

Martienssen et al., Physics Letters, Vol. 24A, No. 2, Jan. 1967, pp. 126–128

Caulfield, Optics Communications, Vol. 3, No. 5, July 1971, pp. 322–323

*Primary Examiner*—Ronald J. Stern
*Attorney*—Glenn H. Bruestle, George J. Seligsohn and Irwin M. Krittman

[57] ABSTRACT

By playing back a redundant hologram composed of a predetermined periodic pattern of subholograms with a scanning laser beam no larger in size than a subhologram, a greater optical efficiency and a higher signal-to-noise ratio are achieved. Two spatially-multiplexed redundant holograms of two separated scenes or objects may be recorded on the same given area of a recording medium.

10 Claims, 11 Drawing Figures

SPATIAL FILTER MASK I

SPATIAL FILTER MASK II

HOLOGRAM TAPE

READOUT BEAM INTENSITY CURVE

SCANNING LASER READOUT BEAM INTENSITY CURVE

PLAYING BACK REDUNDANT HOLOGRAMS BY SCANNING

This invention relates to holography and, more particularly, to improved techniques for recording and playing back redundant holograms.

Systems have been developed for recording a given type of redundant hologram consisting of a plurality of separate subholograms arranged in a predetermined two-dimensional periodic pattern. All of these separate subholograms are of the same given scene and are of substantially the same given size. One such system for recording this type of redundant hologram, disclosed in copending U.S. Pat. Application Ser. No. 133,807, filed Apr. 14, 1971 by Lurie, now U.S. Pat. No. 3,689,129 employs a redundancy means consisting of a pinhole array mask. Another such system, disclosed in the copending U.S. Patent Application Ser. No. 206,435, filed Dec. 9, 1971 by Firester, now abandoned, employs as a redundancy means a combination of the pinhole array with a corresponding Fresnel lens array. Although not limited thereto, this given type of redundant hologram is particularly useful for recording the frames of a motion picture as a sequence of phase holograms on a master from which duplicate hologram record pressings may be made and then played back over a closed-circuit television system.

It is conventional in playing back a hologram to illuminate the hologram with a readout beam of coherent light having a cross section about the same size as that of a single hologram being played back. Since this beam of coherent light, which is obtained from a laser source, initially has a cross section much smaller than the overall size of a hologram, it is conventional to employ a beam enlarger to increase the cross section of the readout beam. Since the intensity of a beam of coherent light is naturally not uniform over its cross section, but varies in accordance with a Gussian distribution, it is usual to employ only a portion of the available coherent light in order to obtain improved uniformity. One way that this may be accomplished is to enlarge the beam of coherent light to a substantially greater cross section that is required and then employ only the central portion thereof. Another way improved uniformity may be accomplished is to pass the beam of coherent light through a variable-density filter, in accordance with the teachings of U.S. Pat. No. 3,558,208. In either case, substantial portion of the originally available coherent light is wasted.

In accordance with one aspect of the present invention, a scanned laser beam of small cross section with respect to that of the overall hologram is employed as a readout beam during playback of the aforesaid given type of redundant hologram. The use of a scanned laser beam, in addition to provide significantly greater optical efficiency, has the effect of increasing the signal-to-noise ratio of the reconstructed image which is achievable. The redundant hologram may be recorded so that the separation between adjacent subholograms is greater than the cross section of the scanning laser beam employed to read out the hologram. This results in eliminating, or at least substantially reducing, unwanted spatial beat frequency patterns in the reconstructed image. This last-named type of recording of a redundant hologram may be accomplished without loss of information packing density on the hologram recording medium by sequentially recording two spatially-multiplexed redundant holograms of two separated scenes or objects.

These and other features and advantages of the present invention will becomes more apparent from the following detailed description, taken together with the accompanying drawing, in which:

FIG. 1 is an embodiment of a preferred hologram recording system which may be employed by the present invention;

FIG. *2a* and *2b* illustrate the respective arrangements of spatial filter masks I and II utilized in the hologram recording system of FIG. 1;

FIG. 3 shows a segment of a moving hologram tape employed in the hologram playback apparatus of FIGS. 4 and 5;

Each of FIGS. 4 and 5 shows an embodiment of hologram playback apparatus for the present invention with the hologram tape being in position I in FIG. 4 and in position II in FIG. 5;

Figure 1:
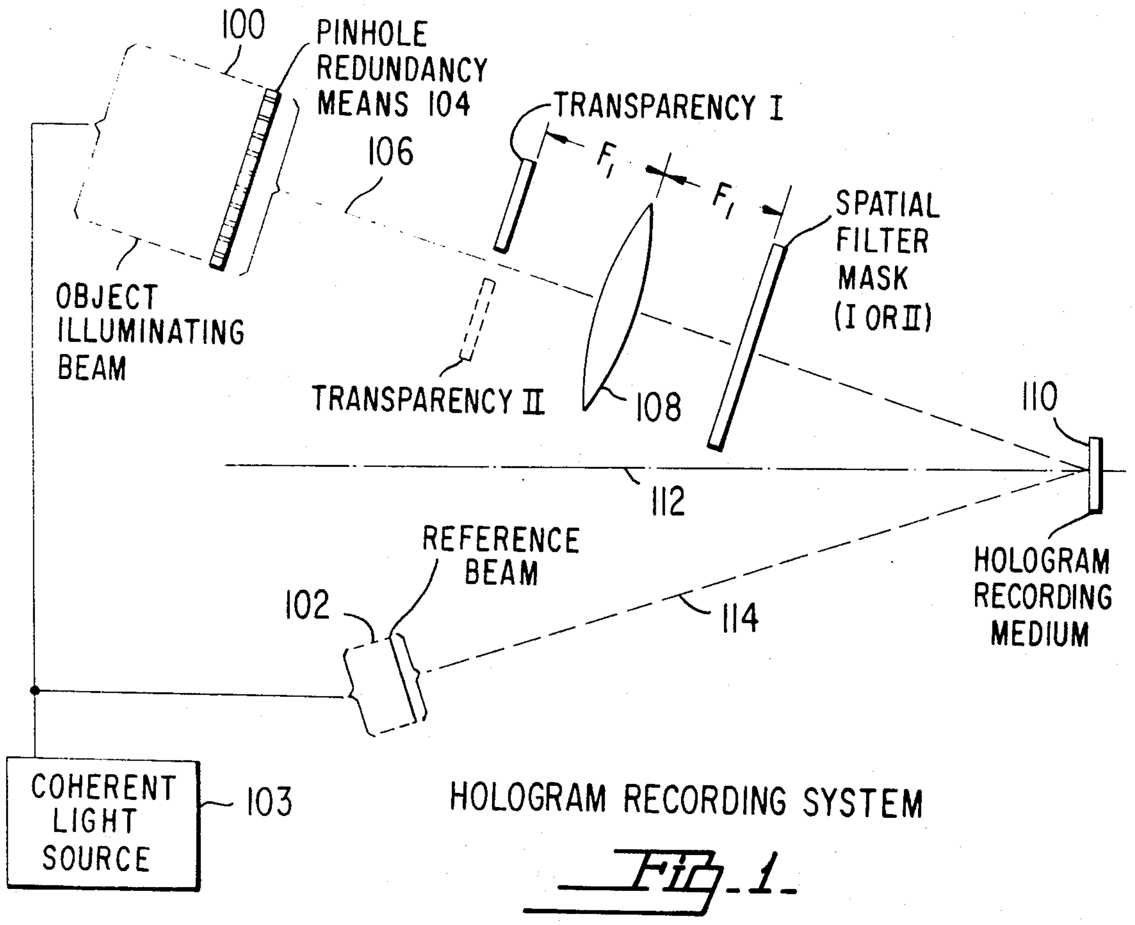

The hologram recording system of FIG. 1 comprises mutually coherent object illuminating beam 100 and reference beam 102, which as shown schematically are obtained from coherent light source 103. Coherent light source 103 may include a laser and such conventional optics employed in holography as a beam splitter, beam enlargers and mirrors arranged to derive each of mutually coherent object illuminating beam 100 and a reference beam 102.

In the path of object illuminating beam 100 is pinhole redundancy means 104. Pinhole redundancy means 104 includes a pinhole array either alone, such as disclosed in said Lurie patent application Ser. No. 133,807, or in combination with a corresponding lens array, such as the Fresnel lens array disclosed in said Firester patent application Ser. No. 206,435. In any case, the pinholes of the pinhole redundancy means are arranged in a given two-dimensional periodic pattern. Solely for illustrative purposes, it will be assumed that this pattern is a so-called square pattern, where the pinholes are arranged in rows and columns with the distance between the centers of adjacent pinholes in each row and the distance between the centers of adjacent pinholes of each column all being equal to each other.

Although the wavefront of the coherent light emerging from pinhole redundancy means 104 is quite complex, it is still symmetrically disposed about axial ray 106 of the object beam. Therefore, for purposes of clarity in the drawing, only axial ray 106 of the object beam has been shown. Imaging lens 108, which has a focal length $F_1$, is symmetrically disposed, as shown, about axial ray 106 in the path of the object beam. An object, consisting of transparency I is situated in the front focal plane of imaging lens 108 and is located, as shown, on the upper side of axial ray 106. Disposed about axial ray 106 in the back focal plane of image 108 is spatial filter mask I. Spatial filter mask I is supplied with a first subset of holes arranged in the pattern shown in FIG. 2*a*.

Hologram recording medium 110, which is oriented in a plane perpendicular to axis 112, has a given area thereof illuminated by the portion of the object beam which passes through the first subset of holes in spatial filter mask I. Simultaneously this given area of hologram recording medium 110 is illuminated by reference beam 102, which is disposed symmetrically about reference beam axial ray 114. Although not essential, it is preferable that the angle between reference beam axial ray 114 and axis 112 be substantially equal to the angle between object beam axial ray 106 and axis 112.

Figure 2A:
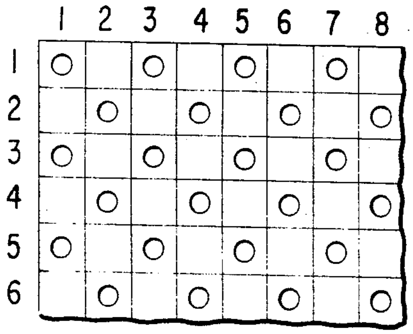

Considering now the operation of the hologram recording system of FIG. 1, a first given scene depicted by transparency I is redundantly illuminated by the coherent light of the object beam emerging from pinhole redundancy means 104. The amount of redundancy with which transparency I is illuminated depends both on pinhole redundancy means 104 itself and on the spacing between pinhole redundancy means 104 and the front focal plane of the imaging lens 108 (as more fully described in the aforesaid Lurie patent application Ser. No. 133,807). In any event, imaging lens 108 causes a predetermined pattern of coherent light images of the first given scene depicted by redundantly illuminated transparency I to be established in an area of the back focal plane of imaging lens 108. The first subset of holes of spatial filter mask I, shown in FIG. 2*a*, are arranged to permit only coherent light from each of a first subset consisting of alternate ones of the predetermined pattern of images to pass therethrough and illuminate separate portions of a given area of hologram recording medium 110 which given area is simultaneously illuminated by reference beam 114. In this manner, a first subset of subholograms of the first given scene depicted by transparency I is recorded within the given area of hologram recording medium 110. Preferably, the distance between the back plane of imaging lens 108 and hologram recording medium 110 (which is not to scale in FIG. 1) should be such that the size of the space on hologram recording medium 110 separating two adjacent subholograms of the first subset is substantially equal to the size of an individual subhologram.

Figure 2B:
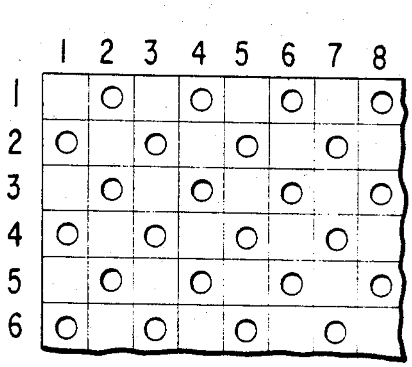

After a redundant hologram of the first given scene has been recorded on hologram recording medium 110, transparency I is removed from the front focal plane of lens 108 and transparency II (shown in phantom) depicting a second given scene is placed in the front focal plane of imaging lens 108 below axial ray 106, as shown in FIG. 1. In addition, spatial filter mask I is removed and spatial filter mask II is substituted therefor. Spatial filter mask II is supplied with a second subset of holes arranged in the pattern shown in FIG. 2*b*. By comparing 2*b* with 2*a* it will be seen that the two subsets are mutually exclusive and that each hole of either one of the two subsets is interposed between adjacent ones of the other of the two subsets.

A second redundant hologram of the second given scene is then recorded on the given area of hologram recording medium 110. In this case, imaging lens 108 establishes the same predetermined two-dimensional pattern of coherent light images of the second given scene as was established for the first given scene during the recording of the first redundant hologram. However, now the presence of spatial filter mask II, instead of spatial filter mask I employed during the recording of the first redundant hologram, permits only coherent light from each of a second subset of the coherent light images, which consists of the remaining ones of the predetermined pattern which are not part of the first subset, to pass therethrough and illuminate separate portions of the given area of hologram recording medium 110.

This given area is also then being illuminated by reference beam 114, which results in the recording on the given area of hologram recording medium 110 of subholograms of the second scene which are the same size as the subhologram of the first given scene and which, preferably, are individually interposed between each pair of adjacent subholograms of the first given scene.

In practice, hologram recording medium 110 may be in the form of a tape comprising a photoresist coating on a suitable plastic substrate; transparency I may be a first motion picture with the first given scene corresponding to any single frame thereof and transparency II may be a second motion picture with the second given scene corresponding to any single frame thereof. Such a tape, after exposure and development, records the successive frames of the first and second motion pictures as a series of phase holograms. Such a recorded tape may be employed as a master to make a metal intermediate, which can then be employed to mass-produce duplicate hologram record pressings of the first and second motion picture in the thermoplastic tape such as a vinyl tape. Such a hologram tape may be played back by moving it past a coherent read-out beam of light to reconstruct either motion picture on the photo-detecting surface of a television camera of a closed circuit television system.

Figure 3:
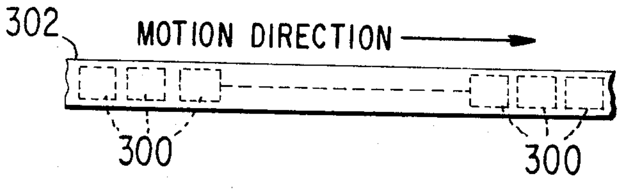

By way of example, FIG. 3 shows a segment of a typical moving hologram tape. In particular, successive areas 300 of hologram tape 302 may have recorded thereon (by the hologram recording system of FIG. 1) two spatially-multiplexed redundant holograms respectively manifesting the scenes depicted in a different single one of a sequence of frames of first and second respective motion pictures. Hologram tape 302 may be played back by the playback apparatus illustrated in FIGS. 4 and 5.

Figure 4:
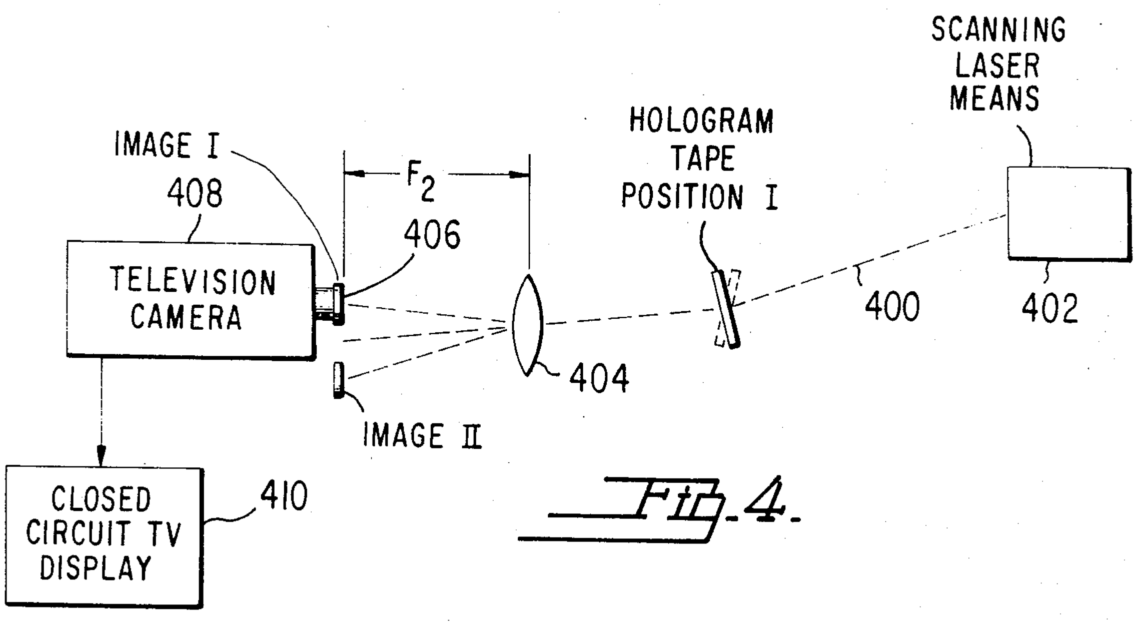
Figure 5:
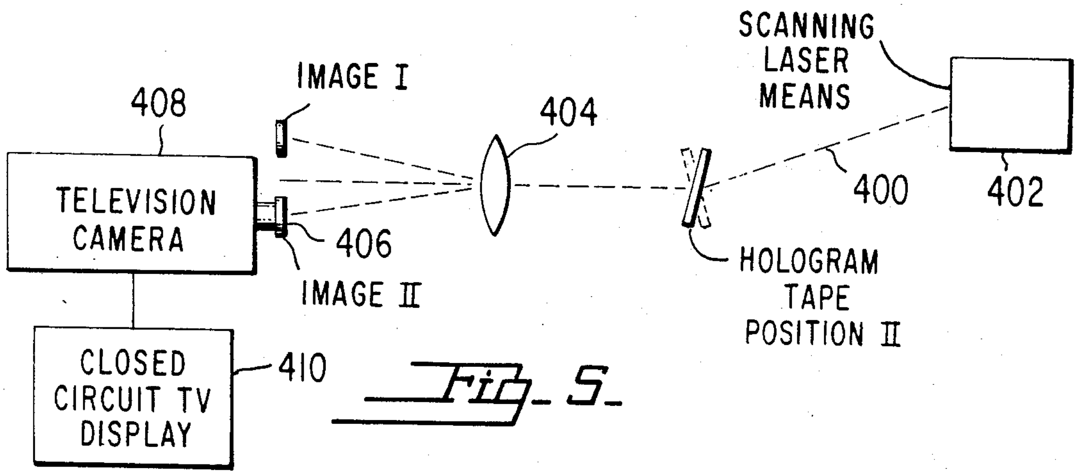

Referring now to FIGS. 4 and 5, the hologram tape, such as that shown in FIG. 3, is capable of having its position switched between a position I thereof, shown in FIG. 4, and a position II thereof, shown in FIG. 5. The relative respective orientations of hologram tape position II in FIG. 4 and of hologram tape position I in FIG. 5 are shown in phantom.

In both FIGS. 4 and 5, the hologram tape is illuminated with scanning laser readout beam 400 obtained from scanning laser means 402. Examples of the structure of scanning laser means 402 and details of scanning laser readout beam 400 will be discussed more fully below. However, all that need be said at this time is that the relative positions of scanning laser means 402, Fraunhofer imaging lens 404 (which has a focal length $F_2$) and photodetecting surface 406 of television camera 408 with respect to the hologram tape are such that when the hologram tape is in position 1 (shown in FIG. 4) the position of reconstructed image I of the first given scene, manifested by the spatial-multiplexed redundant hologram then being read out, coincides with photodetecting surface 406 and is picked up by television camera 408 (while reconstructed image II of the second given scene is spatially separated from photodetecting surface 406 and is not picked up by television camera 408). As shown in FIG. 5, with the hologram tape switched to position II, the positions of reconstructed images I and II are moved so that now reconstructed image II coincides with photodetecting surface 406 and is picked up by television camera 408 (while now reconstructed image I is spatially separated from photodetecting surface 406 and is not picked by television camera 408). As shown in each of FIGS. 4 and 5, the picked up image of either the first or second given scene, as the case may be, is displayed by closed circuit TV display 410.

Figure 6:
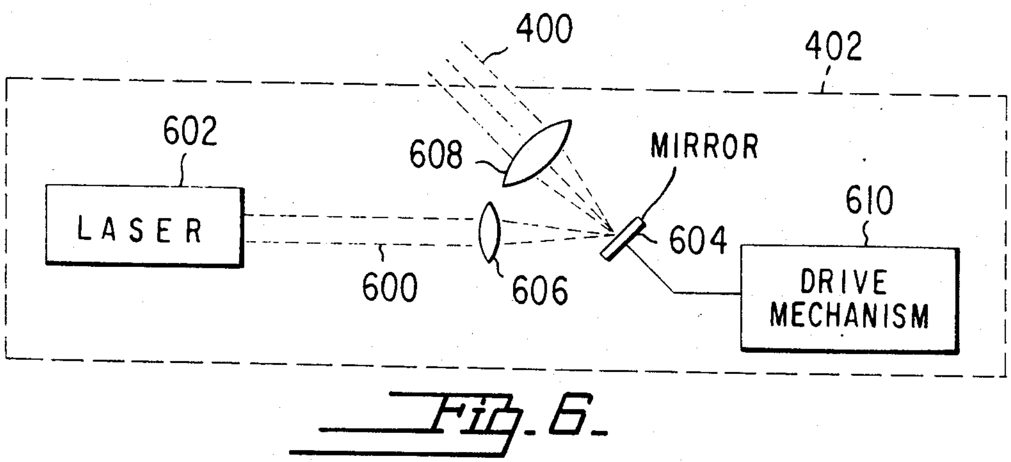
FIG. 6 shows a first embodiment of the scanning laser means of FIGS. 4 and 5.

FIG. 6 shows a first embodiment of scanning laser means 402. As shown, output beam 600 from laser 602 is focused on the surface of plane mirror 604 by lens 606. The reflected coherent light from mirror 604 is collimated by lens 608 to form a laser readout beam 400 which has a cross section no greater than, and preferably equal to, the cross section of a subhologram of a redundant hologram on the hologram tape being read out. Mirror 604 is moved in a predetermined manner by drive mechanism 610 to provide a desired scan for laser readout beam 400.

Figure 7:
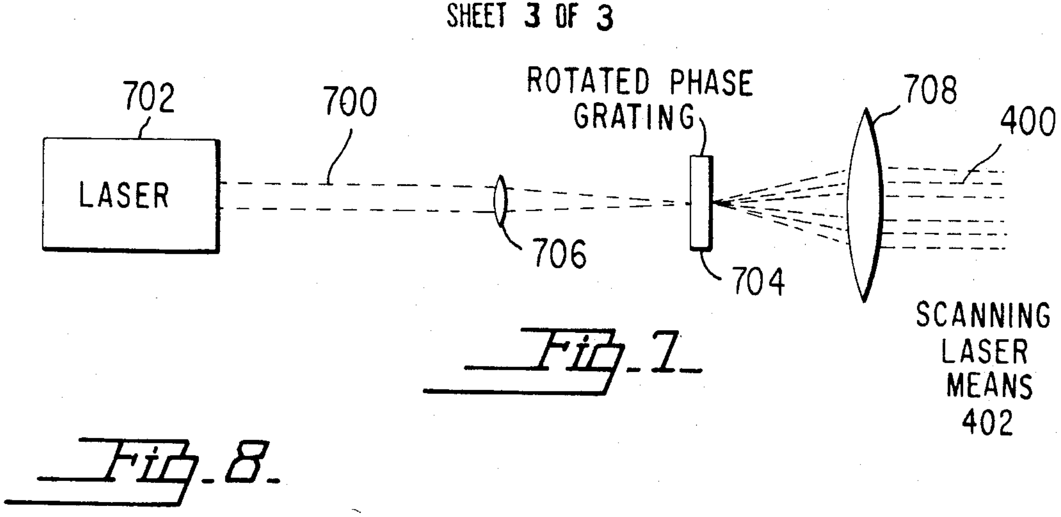
FIG. 7 shows a second embodiment of the scanning laser means of FIGS. 4 and 5.

An alternative embodiment for scanning laser means 402 is shown in FIG. 7. In this case, laser output beam 700 of laser 702 is focused on a rotated phase grating 704 by means 706. Phase grating 704 derives by diffraction a plurality of diverging output beams which are collimated by lens 708 into an array of parallel laser readout beams 400. Rotating the phase grating causes the array of beams to rotate. It also allows the effective area of the grating to be increased (i.e., the laser beam is not focused on only one point on the grating). The size of each of laser readout beams 400 is chosen to be no greater than, and preferably equal to, the size of a subhologram of a redundant hologram recorded on the hologram tape. Furthermore, the spacing between adjacent ones of the array of laser readout beams 400 in FIG. 7 is such that a subhologram can be illuminated by no more than a single one of the array of laser readout beams 400 at a time.

Figure 8:
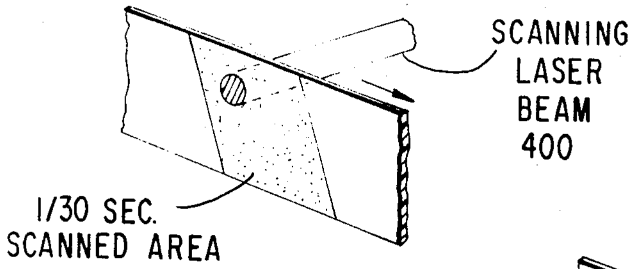
FIG. 8 shows a first scanning configuration of the scanning laser beam.
Figure 9:
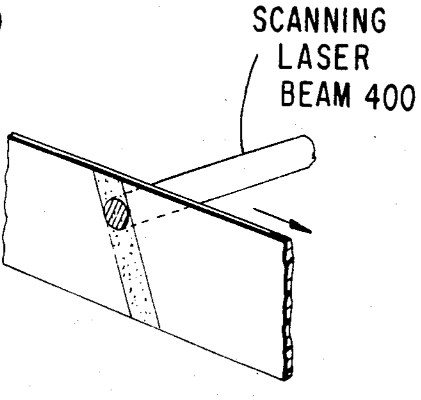
FIG. 9 shows a second scanning configuration of the scanning laser beam.

As indicated by the arrow in each of FIGS. 8 and 9, the hologram tape is normally in continuous motion in a longitudinal motion with respect to the tape. Normally the speed of this longitudinal motion of the tape is such that the area of the tape scanned in one-thirtieth second is equal to that occupied by a single redundant hologram 300, shown on hologram tape 302 in FIG. 3. The scanned configuration may take various forms. In FIG. 8, a one-thirtieth second scanned area of the tape is scanned in two dimensions by either a single scanning laser beam 400 obtained from the embodiment of FIG. 6 or from an array of scanning laser beams 400 obtained from the embodiment of FIG. 7. For such a two-dimensional scan, mirror 604 is moved ineach of two orthogonal directions by drive mechanism 610.

Another scan configuration is shown in FIG. 9. In this case, a single scanning laser beam 400 is moved solely transversely with respect to the tape by mirror 604 which is moved only in a single direction by drive mechanism 610. Since out-of-flatness in the portion of the tape being scanned results in distortion in the reconstructed image picked up by the television camera tube, scanning configuration of FIG. 9 has an advantage over that of FIG. 8 in that it requires a smaller area of the tape to be maintained flat.

Figure 10:
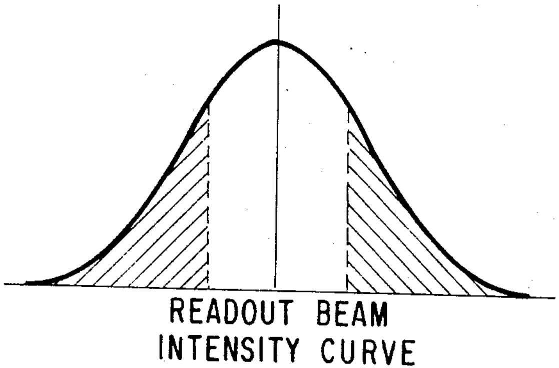
FIG. 10 PRIOR ART
FIG. 10 shows a typical intensity curve of an enlarged readout beam with coherent light employed by the prior art.
Figure 11:
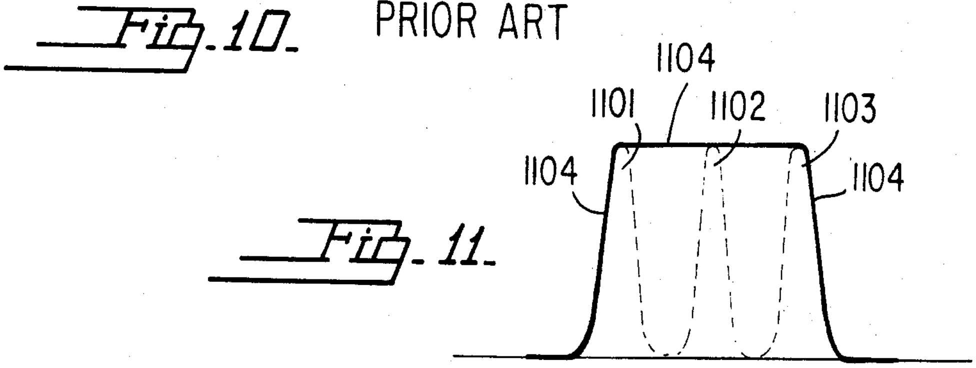
FIG. 11 shows a similar intensity curve for the scanning laser readout beam employed by the present invention.

One of the benefits of employing the relatively small size scanning laser readout beam, rather than the conventional relatively large size beam-enlarged readout beam of the prior art, is brought out by comparing the intensity curve of FIG. 11 with that of FIG. 10. The intensity of all light beams, as a function of the distance away from the center of the beams, inherently varies as a Gussian distribution. However, a wider beam will have a wider Gussian distribution. In the case of the prior art, shown in FIG. 10, it is usuallynecessary to spatially filter out the left and right portions of the beam (shown in shading) in order to achieve even a somewhat uniform intensity over the useable portion of the beam. Not only does this waste a significant portion of the available coherent light, but the uniformity obtainable (if reasonable optical efficiency is to be retained) is still not too good, as shown in FIG. 10. Although this uniformity can be improved by using the variable density filter disclosed in the aforesaid U.S. Pat. No. 3,558,208, this still provides relatively poor optical efficiency. Although the scanning laser readout beam of the present invention (shown in FIG. 11 in phantom by reference numerals 1101, 1102, and 1103 in three respective positions of the scan configuration) retains is Gussian distribution, still the overall scan thereof (indicated by a solid line 1104) is substantially uniform except for its leading and lagging edges. However, the leading and lagging edges have a relatively high slope due to the relatively small size of the scanning laser readout beam itself. Thus, high optical uniformity with high optical efficiency is obtained by the use of a scanning laser readout beam.

Furthermore, the fact that the coherent light of the scanning laser readout beam is not reading out all the subholograms of a redundant hologram at the same time reduces unwanted heat frequency effect in the reconstructed image. This reduction is maximized by maintaining adjacent subholograms sufficiently far apart from each other with respect to the size of the scanning laser readout beam so that it is impossible for the scanning laser readout beam to be scanning one subhologram of a given scene at the same time that it is scanning another subhologram of that given scene. This is achieved by the spatially-multiplexed recording of the hologram described in connection with FIG. 1 without the undesirable side effect of reducing the information packing density per unit area of the recorded hologram.

Although in the preferred embodiment of the present invention a scanning laser readout beam is employed for reading out a hologram recorded in accordance with the system of FIG. 1, this is not essential to achieve at least some of the benefits of the present invention. The use of a scanning laser readout beam to play back any given type of redundant hologram which includes a predetermined two-dimensional periodic pattern of a plurality of subholograms of the same given scene, wherein all of the subholograms are of substantially the same given size and which together are capable on playback of reconstructing a single registered real image of the scene, is contemplated by the present invention.

What is claimed is:

1. Hologram playback apparatus for playing back a given type of redundant hologram recorded on a medium, said given type of redundant hologram including a predetermined two-dimensional periodic pattern of a plurality of subholograms of the same given scene all of which are of substantially the same given size and which together are capable on playback of simultaneously reconstructing a single registered real image of said scene in a given area of space with respect to said medium; said apparatus comprising first means for deriving a laser beam having a cross section no greater than said given size and second means for moving and orienting said laser beam and said medium with respect to each other to successively scan said subholograms of said predetermined periodic pattern and to reconstruct said single registered real image.

2. The apparatus defined in claim 1, wherein said first means derives a laser beam having a cross section substantially equal to said given size.

3. The apparatus defined in claim 1, wherein said medium is a tape, and wherein said second means includes means for continuously moving said tape solely in its longitudinal direction while repetitively scanning said tape solely in its transverse direction with said laser beam.

4. The apparatus defined in claim 1, wherein said redundant hologram covers a predetermined area of said medium and wherein said second means includes means for moving said laser beam in two dimensions with respect to said medium over said entire predetermined area of said medium to thereby scan all of said subholograms of said redundant hologram.

5. The appartus defined in claim 1, wherein said second means includes third means for deriving from said laser beam a group of moving, separate, substantially parallel laser beams each having a cross section no greater than a subhologram to scan therewith all of said subholograms.

6. The apparatus defined in claim 5, wherein said third means includes a first lens for focusing said first-mentioned laser beam in the back focal plane thereof, a phase grating situated substantially in said back focal plane of said first lens to derive a group of diverging laser beans, and a second lens having its front focal plane in substantial coincidence with said back focal plane of said first lens for collimating said group of diverging laser beams into said group of parallel laser beams, said phase grating being rotatable about an axis parallel to the axis of said first-mentioned laser beam to rotate said group of parallel laser beams.

7. The apparatus defined in claim 1, wherein said given type of redundant hologram includes a second two-dimensional periodic pattern of a plurality of separate subholograms of the same second given scene all of which are of substantially said given size and which together are capable on playback of reconstructing a single registered real image of said second scene in a second given area of space with respect to said medium which is entirely separated from said first-mentioned area of space, and wherein said apparatus further includes a television camera having a photodetecting surface, and selectively operable positioning means for alternatively orienting said scanning laser beam, said medium and said camera with respect to each other so that said photodetecting surface coincides solely with said first-mentioned of said given area of space or solely with said second of said given area of space.

8. The apparatus defined in claim 1, further including said medium having said given type of redundant holgram recorded thereon.

9. The apparatus defined in claim 8, wherein said subholograms are separated from each by an amount at least the size of said cross section of said laser beam.

10. The apparatus defined in claim 9, wherein said first means derives a laser beam having a cross section substantially equal to said given size.

* * * * *

UNITED STATES PATENT OFFICE
CERTIFICATE OF CORRECTION

Patent No. 3,785,712 Dated January 15, 1974

Inventor(s) William James Hannan

It is certified that error appears in the above-identified patent and that said Letters Patent are hereby corrected as shown below:

Column 1, line 38, "Gussian" should read --Gaussian--. Column 5, line 31, "means" should read --lens--. Column 6, lines 11, 12 and 28, each occurrence, "Gussian" should read --Gaussian--. Column 6, line 40, "heat" should read --beat--.

Signed and sealed this 11th day of June 1974.

(SEAL)
Attest:

EDWARD M.FLETCHER,JR.
Attesting Officer

C. MARSHALL DANN
Commissioner of Patents